US012566450B2

(12) United States Patent
Rahman et al.

(10) Patent No.: US 12,566,450 B2
(45) Date of Patent: Mar. 3, 2026

(54) FEDERATED DEEP REINFORCEMENT LEARNING-ASSISTED UAV TRAJECTORY PLANNING AGAINST HOSTILE DEFENSE SYSTEM

(71) Applicants: Mohammad Ashiqur Rahman, Miami, FL (US); Alvi Ataur Khalil, Miami, FL (US)

(72) Inventors: Mohammad Ashiqur Rahman, Miami, FL (US); Alvi Ataur Khalil, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 39 days.

(21) Appl. No.: 18/601,091

(22) Filed: Mar. 11, 2024

(65) Prior Publication Data

US 2025/0224730 A1     Jul. 10, 2025

Related U.S. Application Data

(60) Provisional application No. 63/545,077, filed on Oct. 20, 2023.

(51) Int. Cl.
| | |
|---|---|
| *G05D 1/46* | (2024.01) |
| *G05D 101/15* | (2024.01) |
| *G05D 105/35* | (2024.01) |

(52) U.S. Cl.
CPC ........... *G05D 1/46* (2024.01); *G05D 2101/15* (2024.01); *G05D 2105/35* (2024.01)

(58) Field of Classification Search
None
See application file for complete search history.

(56) References Cited

U.S. PATENT DOCUMENTS

| | | | | |
|---|---|---|---|---|
| 11,703,853 B2* | 7/2023 | Hong | ................. | G08G 5/26 |
| | | | | 701/3 |
| 2024/0078915 A1* | 3/2024 | Roper, Jr. | ............... | G08G 5/56 |
| 2024/0205095 A1* | 6/2024 | Bertizzolo | ........... | H04L 41/122 |

OTHER PUBLICATIONS

Saraswat et al., "Blockchain-Based Federated Learning in UAVs Beyond 5G Networks: A Solution Taxonomy and Future Directions", IEEE Access, vol. 10, Mar. 30, 2022, pp. 33154-33182 (Year: 2022).*

Javaid et al., "Communication and Control in Collaborative UAVs: Recent Advances and Future Trends", IEEE Transactions on Intelligent Transportation Systems, vol. 24, Issue 6, Feb. 23, 2023, pp. 1-20 (Year: 2023).*

Haythem Bany Salameh et al., Federated reinforcement learning approach for detecting uncertain deceptive target using autonomous dual UAV system, Information Processing and Management 60 (2023) 103149, 16 pages.

* cited by examiner

*Primary Examiner* — Tamara L Weber
(74) *Attorney, Agent, or Firm* — SALIWANCHIK, LLOYD & EISENSCHENK

(57) ABSTRACT

Systems, frameworks, and methods for reinforcement learning (RL)-based real-time path planning for unmanned aerial vehicles (UAVs) are provided. The learning capabilities of federated learning (FL) can be integrated with an improved deep RL framework, including using a significant reply memory buffer (SRMB) to accelerate the intelligent behavior. The framework can train a UAV to intelligently dodge static and dynamic defense systems and achieve assigned goals (e.g., in a hostile area). The FL can enable collaborative learning through a swarm of UAV agents.

18 Claims, 14 Drawing Sheets

(a)                                    (b)

---

Figure 12:
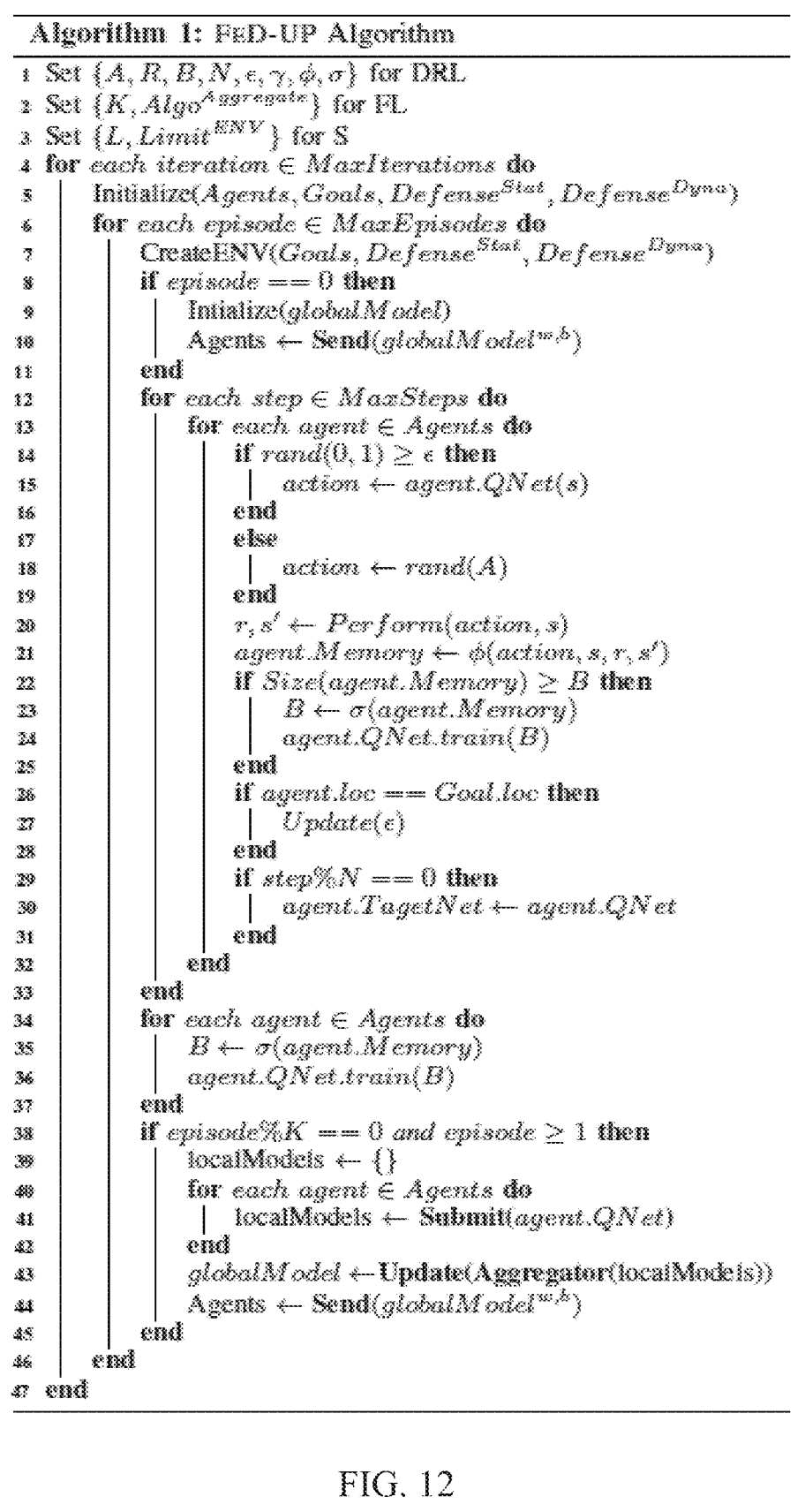

Algorithm 1: FED-UP Algorithm

---

1  Set $\{A, R, B, N, \epsilon, \gamma, \phi, \sigma\}$ for DRL
2  Set $\{K, Algo^{Aggregate}\}$ for FL
3  Set $\{L, Limit^{ENV}\}$ for S
4  for each iteration $\in MaxIterations$ do
5   Initialize($Agents, Goals, Defense^{Stat}, Defense^{Dyna}$)
6   for each episode $\in MaxEpisodes$ do
7    CreateENV($Goals, Defense^{Stat}, Defense^{Dyna}$)
8    if episode == 0 then
9     Intialize($globalModel$)
10    Agents $\leftarrow$ Send($globalModel^{w,b}$)
11   end
12   for each step $\in MaxSteps$ do
13    for each agent $\in Agents$ do
14     if $rand(0, 1) \geq \epsilon$ then
15      $action \leftarrow agent.QNet(s)$
16     end
17     else
18      $action \leftarrow rand(A)$
19     end
20     $r, s' \leftarrow Perform(action, s)$
21     $agent.Memory \leftarrow \phi(action, s, r, s')$
22     if $Size(agent.Memory) \geq B$ then
23      $B \leftarrow \sigma(agent.Memory)$
24      $agent.QNet.train(B)$
25     end
26     if $agent.loc == Goal.loc$ then
27      $Update(\epsilon)$
28     end
29     if $step\%N == 0$ then
30      $agent.TagetNet \leftarrow agent.QNet$
31     end
32    end
33   end
34   for each agent $\in Agents$ do
35    $B \leftarrow \sigma(agent.Memory)$
36    $agent.QNet.train(B)$
37   end
38   if $episode\%K == 0$ and $episode \geq 1$ then
39    $localModels \leftarrow \{\}$
40    for each agent $\in Agents$ do
41     $localModels \leftarrow$ Submit($agent.QNet$)
42    end
43    $globalModel \leftarrow$ Update(Aggregator($localModels$))
44    Agents $\leftarrow$ Send($globalModel^{w,b}$)
45   end
46  end
47 end

LIST OF NOTATIONS

| Symbol | Definition |
|--------|------------|
| $S$ | Set of states |
| $s$ | Current state |
| $s'$ | Next state |
| $A$ | Set of actions |
| $R$ | Reward function |
| $r$ | Current reward |
| $L$ | Agent's observable number of layers |
| $K$ | FL model update interval (episodes) |
| $N$ | Target model update interval (steps) |
| $B$ | Batch size of Q-network training samples |
| $T$ | Transition probability |
| $\pi$ | Policy |
| $\epsilon$ | Exploration parameter |
| $\gamma$ | Discount factor |
| $\phi$ | Sorting parameter |
| $\sigma$ | Sampling rate |
| $\delta$ | $\phi$ value increment interval |

FIG. 13

COMPARISON OF FED-UP'S PERFORMANCE WITH DIFFERENT
AGGREGATION ALGORITHMS

| Algorithm | Average Reward after 2000 episodes | | | | |
|---|---|---|---|---|---|
| | $K=1$ | $K=3$ | $K=6$ | $K=9$ | $K=12$ |
| FedSGD | -270.4 | -145.3 | -97.5 | -320.4 | -323.7 |
| FedAvg | -104.9 | 53.5 | 127.2 | 110.7 | 105.3 |
| FedMA | -159.5 | -76.4 | 32.6 | -101.5 | -125.3 |

FIG. 14

FEDERATED DEEP REINFORCEMENT LEARNING-ASSISTED UAV TRAJECTORY PLANNING AGAINST HOSTILE DEFENSE SYSTEM

CROSS-REFERENCE TO RELATED APPLICATION

This application claims the benefit of U.S. Provisional Application Ser. No. 63/545,077, filed Oct. 20, 2023, the disclosure of which is hereby incorporated by reference in its entirety, including all figures, tables, and drawings.

BACKGROUND

Modern military defense systems heavily utilize unmanned aerial vehicles (UAVs) for aerial reconnaissance due to their low cost and convenient deployment, making the inspection more accurate and reducing human casualties. However, versatile ground and aerial defense systems are deployed to counter the surveillance/task-assigned UAVs, which target and shoot down the UAVs either by holding a fixed critical position or patrolling the whole area.

BRIEF SUMMARY

Embodiments of the subject invention provide novel and advantageous systems, frameworks, and methods for reinforcement learning (RL)-based real-time path planning for unmanned aerial vehicles (UAVs). Embodiments address the challenges discussed in the Background section by integrating the learning capabilities of federated learning (FL) with an improved deep RL framework, including using a significant reply memory buffer (SRMB) to accelerate the intelligent behavior. The framework can train a UAV to intelligently dodge static and dynamic defense systems and achieve assigned goals (e.g., in a hostile area). The FL can enable collaborative learning through a swarm of UAV agents.

In an embodiment, a system for real-time path planning for UAVs can comprise: a processor; and a machine-readable medium in operable communication with the processor and having instructions stored thereon that, when executed by the processor, perform the following steps: a) receiving experience data of a plurality of UAVs in an environment; b) sorting the experience data into critical experience data and non-critical experience data; c) storing the critical experience data in a first reply memory buffer that is an SMRB and storing the non-critical experience data in a second reply memory buffer; d) performing a sample technique on the critical experience data from the first reply memory buffer and the non-critical experience data from the second reply memory buffer to obtain sample data; e) providing the sample data to a Q-network, the Q-network being a first deep reinforcement learning (DRL) neural network; f) copying weights from the Q-network to a target network after a predetermined number of episode steps of the Q-network, the target network being a second DRL neural network; g) using the target network to predict future Q-values for future states; h) calculating a loss of a prediction of the Q-network based on the future Q-values; i) calculating an updated path model for the plurality of UAVs based on the prediction of the Q-network and the loss of the prediction of the Q-network; j) generating, by the plurality of UAVs, updated experience data using the updated path model; and k) repeating steps a)-j), starting with the updated experience data, until the updated path model meets a predetermined threshold to obtain a final path model. The environment can be a simulated environment or a real environment, and the plurality of UAVs can be simulated or real. The experience data can be generated using FL, such as FL of DRL agents (e.g., agents of the first DRL network, agents of the second DRL network, or both). The environment can comprise a hostile defense system, which can comprise a static defense system and/or a dynamic defense system. The sorting of the experience data can comprise classifying experiences where a UAV of the plurality of UAVs ended on a goal or an obstacle as critical experience data and classifying experiences where a UAV of the plurality of UAVs did not end on a goal or an obstacle as non-critical experience data. The performing of the sample technique can comprise setting a value for a percentage (e.g., a value of 0 to 1, where 1 is 100%) of critical experience data from the first reply memory buffer that makes up the sample data, where a remainder of the sample data is the non-critical experience data from the second reply memory buffer. The generating of updated experience data can comprise setting an exploitation parameter in a range of from 0 to 1, where a higher value of the exploitation parameter indicates a higher probability that the plurality of UAVs will take random actions during the generating of updated experience data, and where a lower value of the exploitation parameter indicates a higher probability that the plurality of UAVs will take actions by consulting the Q-network during the generating of updated experience data. The plurality of UAVs can comprise, for example, at least 10 UAVs (e.g., at least 20 UAVs, at least 30 UAVs, at least 40 UAVs, at least 50 UAVs, or at least 100 UAVs). The system can further comprise a display in operable communication with the processor and/or the machine-readable medium, and the instructions when executed can further perform the step of: 1) displaying the final path model (and/or any other information generated during the steps performed when the instructions are executed) on the display.

In another embodiment, a method for real-time path planning for UAVs can comprise: a) receiving (e.g., by a processor) experience data of a plurality of UAVs in an environment; b) sorting (e.g., by the processor) the experience data into critical experience data and non-critical experience data; c) storing (e.g., by the processor) the critical experience data in a first reply memory buffer that is an SRMB and storing the non-critical experience data in a second reply memory buffer; d) performing (e.g., by the processor) a sample technique on the critical experience data from the first reply memory buffer and the non-critical experience data from the second reply memory buffer to obtain sample data; e) providing (e.g., by the processor) the sample data to a Q-network, the Q-network being a first DRL neural network; f) copying weights (e.g., by the processor) from the Q-network to a target network after a predetermined number of episode steps of the Q-network, the target network being a second DRL neural network; g) using (e.g., by the processor) the target network to predict future Q-values for future states; h) calculating (e.g., by the processor) a loss of a prediction of the Q-network based on the future Q-values; i) calculating (e.g., by the processor) an updated path model for the plurality of UAVs based on the prediction of the Q-network and the loss of the prediction of the Q-network; j) generating, by the plurality of UAVs, updated experience data using the updated path model; and k) repeating steps a)-j), starting with the updated experience data, until the updated path model meets a predetermined threshold to obtain a final path model. The environment can be a simulated environment. The environment can be a simulated environment or a real environment, and the plurality of UAVs can be simulated or real. The experience data can be generated using FL, such as FL of DRL agents (e.g., agents of the first DRL network, agents of the second DRL network, or both). The environment can comprise a hostile defense system, which can comprise a static defense system and/or a dynamic defense system. The sorting of the experience data can comprise classifying experiences where a UAV of the plurality of UAVs ended on a goal or an obstacle as critical experience data and classifying experiences where a UAV of the plurality of UAVs did not end on a goal or an obstacle as non-critical experience data. The performing of the sample technique can comprise setting a value for a percentage (e.g., a value of 0 to 1, where 1 is 100%) of critical experience data from the first reply memory buffer that makes up the sample data, where a remainder of the sample data is the non-critical experience data from the second reply memory buffer. The generating of updated experience data can comprise setting an exploitation parameter in a range of from 0 to 1, where a higher value of the exploitation parameter indicates a higher probability that the plurality of UAVs will take random actions during the generating of updated experience data, and where a lower value of the exploitation parameter indicates a higher probability that the plurality of UAVs will take actions by consulting the Q-network during the generating of updated experience data. The plurality of UAVs can comprise, for example, at least 10 UAVs (e.g., at least 20 UAVs, at least 30 UAVs, at least 40 UAVs, at least 50 UAVs, or at least 100 UAVs). The method can further comprise: 1) displaying (e.g., on a display in operable communication with the processor) the final path model (and/or any other information generated during the method).

BRIEF DESCRIPTION OF DRAWINGS

FIG. 5(*a*) shows from an x-y-z axis perspective, and FIG. 5(*b*) shows from a nearly x-y axis perspective. In FIGS. 5(*a*) and 5(*b*), the (blue) towers represent states defense systems, the (red) circles represent dynamic hostile defense systems, and the (green) diamonds represent goals.

FIG. 7(*a*) shows results for environments with only a static defense system (SDS); FIG. 7(*b*) shows results for environments with both a dynamic fixed route defense system (DFRDS) and an SDS; and FIG. 7(*c*) shows results for environments with a dynamic stochastic defense system (DSDS), a DFRDS, and an SDS. In each of FIGS. 7(*a*)-7(*c*), the (blue) line with the triangle data points is for a DRL, the (orange) line with the circle data points is for a DRL with an SRMB (SRMB-DRL), and the (green) line with the "x" data points is for a system of an embodiment of the subject invention, which can be referred to herein as "FeD-UP".

FIG. 8(*a*) shows results after 500 training episodes; FIG. 8(*b*) shows results after 1,000 training episodes; and FIG. 8(*c*) shows results after 2,000 training episodes. In each of FIGS. 8(*a*)-8(*c*), the (blue) bar that is on the right within each grouping of three bars is for DRL, the (orange) bar that 15 is in the middle within each grouping of three bars is for a DRL with an SRMB, and the (green) bar that is on the left within each grouping of three bars is for FeD-UP.

FIG. 9(*a*) shows results for environments with only an SDS; FIG. 9(*b*) shows results for environments with both a DFRDS and an SDS; and FIG. 9(*c*) shows results for environments with a DSDS, a DFRDS, and an SDS. In each of FIGS. 9(*a*)-9(*c*), the (blue) line with the triangle data points is for DRL, the (orange) line with the circle data points is for SRMB-DRL, and the (green) line with the "x" data points is for FeD-UP.

FIG. 10(*a*) shows a plot of average GCP (over 50 iterations) for a series of episodes, with varying σ and φ=1; FIG. 10(*b*) shows a plot of average OEC (over 50 iterations) for a series of episodes, with varying σ and φ=1; and FIG. 10(*c*) shows a plot of average GCP (over 50 iterations) for a series of episodes, with varying φ, σ=0.7. and L=4. In FIG. 10(*a*), the (orange) curve with the lowest GCP value at episode 800 is for σ=0, the (blue) curve with the second-lowest GCP value at episode 800 is for σ=0.33, the (green) curve with the highest GCP value at episode 800 is for σ=0.66, and the (red) curve with the second-highest GCP value at episode 800 is for σ=1. In FIG. 10(*b*), the (orange) curve with the highest OEC value at episode 400 is for σ=0, the (blue) curve with the second-highest OEC value at episode 400 is for σ=0.33, the (green) curve with the second-lowest OEC value at episode 800 is for σ=0.66, and the (red) curve with the lowest OEC value at episode 800 is for G=1. In FIG. 10(*c*), the (orange) curve with the lowest GCP value at episode 600 and the triangle data points is for φ=0, the (blue) curve with the second-lowest GCP value at episode 600 and the circle data points is for φ=0.25, the (green) curve with the third-highest GCP value at episode 600 and the "x" data points is for φ=0.5, the (yellowish-green) curve with the highest GCP value at episode 600 and the diamond data points is for φ=0.75, and the (red) curve with the second-highest value at episode 600 and the arrow data points is for φ=1.

FIG. 12 shows an algorithm that can be used with systems and methods of embodiments of the subject invention.

FIG. 13 shows a table of notations used in this application.

FIG. 14 shows a table of a comparison of performance of FeD-UP with different aggregation algorithms.

DETAILED DESCRIPTION

Figure 1:
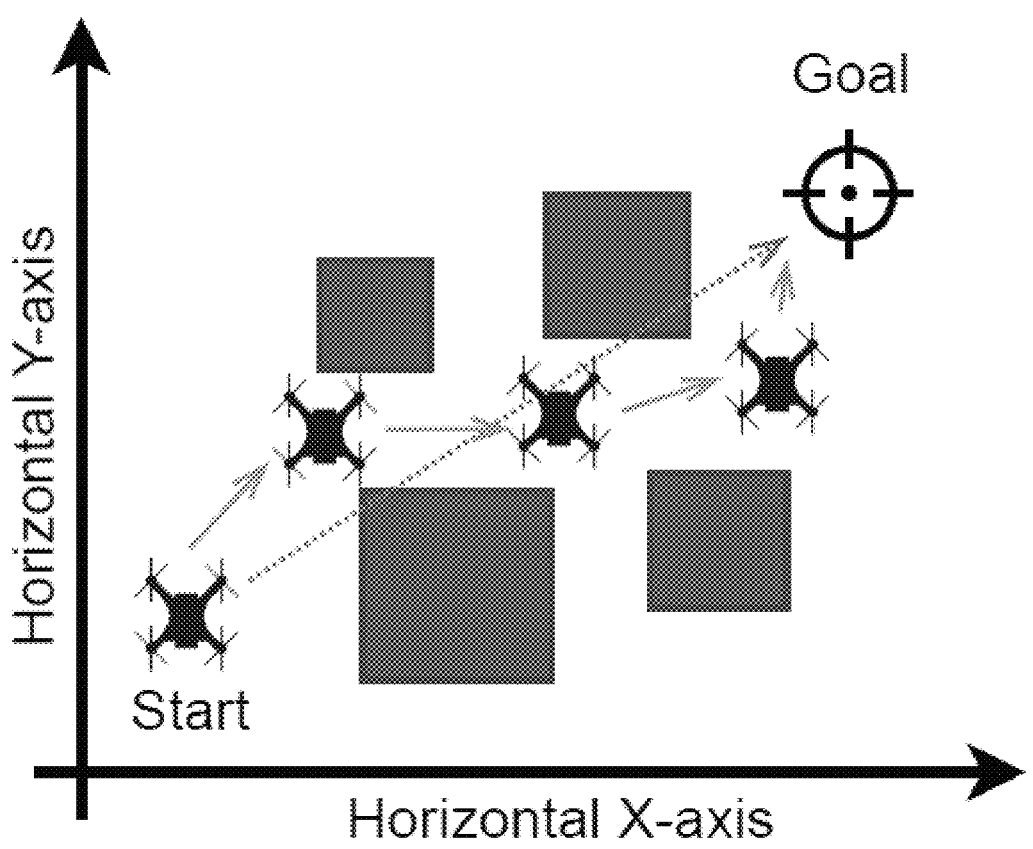
FIG. 1 shows path planning for unmanned aerial vehicles (UAVs) in horizontal (two-dimensional (2D)) space.

Embodiments of the subject invention provide novel and advantageous systems, frameworks, and methods for reinforcement learning (RL)-based real-time path planning for unmanned aerial vehicles (UAVs). Embodiments integrate the learning capabilities of federated learning (FL) with an improved deep RL framework, including using a significant reply memory buffer (SRMB) to accelerate the intelligent behavior. The framework can train a UAV to intelligently dodge static and dynamic defense systems and achieve assigned goals (e.g., in a hostile area). The FL can enable collaborative learning through a swarm of UAV agents.

Due to antenna installment regulation, UAVs cannot be controlled by human operators in a restricted area, and artificial intelligence (AI)-driven UAVs are a practical solution to this out-of-coverage problem. With the increased use of autonomous UAVs in military applications, defense systems are deployed to target and shoot down enemy UAVs in operation. Thus, UAVs must be trained not only to achieve goals but also to avoid static and dynamic hostile defense systems. The federated deep reinforcement learning (DRL)-based UAV path planning framework of embodiments of the subject invention enables UAVs to carry out missions in a hostile environment that has static and/or dynamic defense systems. The FL-based training accelerates the reinforcement learning process and improves model performance. An SRMB can be used to further quicken the training process by selecting the crucial experiences during the training period. The SRMB technique improves the learning process of the DRL by exposing the agent to significant experience repeatedly and can be leveraged to augment the performance of DRL agents in other applications as well. Experimental results validate the efficiency of embodiments of the subject invention in controlling UAVs in dynamic, hostile environments.

Related art UAV path-planning tools consider the global awareness of the agent, and the projected path does not adapt to the dynamic changes in the environment. However, in real-world hostile scenarios, UAVs performing aerial reconnaissance are not always provisioned with global observation, and the dynamic defense systems always alternate their strategy, meaning that path planning formulated ahead of time will fail. Embodiments of the subject invention consider partial awareness of the agent resembling sensor-based observation of the UAV and adapt the trajectory to the dynamic obstacles encountered on the flight. The SRMB module can enable the dynamic adaptation of the trajectory by repeatedly exposing the agent to pivotal experiences and accelerates the intelligent behavior learning of the agent.

Embodiments of the subject invention provide a path planning framework for UAVs deployed in hostile environments that leverages the benefits of FL and DRL for achieving any type of goal while avoiding different enemy defense systems. For aerial reconnaissance, UAVs generally do not have definitive information regarding the hostile environment. Due to the jamming, inference, and out-of-coverage technologies, UAVs cannot be controlled by human operators in those areas. For situations where an agent with artificial intelligence must perform intelligent tasks in unknown circumstances, DRL is an excellent tool for training the agent. In addition, FL provides collaborative learning, where a swarm of agents can collaboratively learn different aspects (i.e., obstacles, defense systems, etc.) of a simulated environment to formulate generalized learning of the hostile settings. Because dynamic defense systems are often unpredictable, real-time decision-making on encountering an enemy is crucial, and this is a difficult behavior to learn through the general training convention of DRL alone. Hence, embodiments of the subject invention improve the standard DRL by introducing an SRMB module, which sorts and samples the critical experiences of the agents and repeatedly utilizes those to accelerate the learning of intelligent behaviors. The UAV agents can be trained in simulated environments. The trained models can drive UAVs in real-hostile environments, including static and dynamic defense systems. Embodiments of the subject invention were validated through a case study in CoppeliaSim Robotics Simulator (see Example 6).

Due to low price, versatility, and compact size, UAVs have garnered considerable interest in both military and civilian industries. In most real-world applications, UAVs must securely move between multiple sites in order to carry out specific tasks. As a result, a trustworthy and effective navigation system in diverse environments is crucial for these UAV applications. Despite progress in making UAV operation increasingly autonomous, UAV path planning in dynamic situations is still difficult because there is little time for it to avoid unforeseen flying obstructions like birds or other aircrafts. In particular, in military applications, where UAVs cannot consistently be controlled by human operators (due to jamming and out-of-coverage issues), UAV path planning becomes an even more sophisticated problem. Military hostile environments include not only static defense systems like UAV fishing towers (through means of collision), but also deployment of enemy drones that patrol through the environment. Embodiments of the subject invention address the need in the art for efficient real-time trajectory planning to dodge enemy defense systems and complete various tasks in hostile environments.

In simple situations, traditional path planning algorithms are somewhat effective at avoiding obstacles. However, with complex environments having dynamic obstacles, traditional methods require recalculation to adjust for changes in the environment and completely fail when reassigning unknown goals. RL techniques, though, can adapt the paths almost immediately. In basic RL, an agent manages a Q-table for each state-action pair, which is suitable for simple small-scale environments (having a considerably limited number of states). However, as the environment gets sophisticated, resembling real-world hostile setups, Q-table size gets exponentially larger, making it difficult or infeasible to utilize.

In order to counter the limitations of related art path planning solutions, embodiments of the subject invention provide a federated DRL-based UAV path planning framework for real-time UAV trajectory design in hostile environments with static and dynamic defense systems. The systems, methods, and frameworks of embodiments of the subject invention can be referred to herein as "FeD-UP". DRL offers exceptional feature learning capabilities, allowing it to process complicated, high-dimensional states and extract clear, useful feature information from them. The FL helps to speed up the exploration of the environment as a swarm of UAVs parallelly interact with diverse states of the environment. Even just one UAV of the swarm experiencing the goal completion and obstacle encounter helps the training of the whole swarm through aggregation at the global model. In order to further accelerate the learning, an SRMB can be used, which controls the batch samples used for training the FeD-UP model, prioritizing the significant state experiences. Embodiments provide at least the following: a novel UAV trajectory planning architecture for hostile environments; an SRMB module for selective training to accelerate the intelligent behavior learning; evaluation of the framework with respect to goal completion, obstacle avoidance, and traveled distance (evaluation results show that FeD-UP performs better than standard DRL, especially in dynamic hostile environments). A case study was also performed using the graphic simulator CoppeliaSim Robotics (see, Rooban et al., CoppeliaSim: Adaptable modular robot and its different locomotions simulation framework, Materials Today: Proceedings, 2021; which is hereby incorporated by reference in its entirety) to validate the performance of FeD-UP (see Example 6).

Path planning is the process of determining the best route between a source and a destination, and it is one of the most critical problems that need to be investigated in the field of UAVs. The primary goal of UAV path planning is to create a cost-effective flight path that satisfies the UAV performance criteria with a low chance of being destroyed during the flight. The basic path planning problem includes specific routes to choose from for reaching the goal, while in the case of UAVs, the problem is more sophisticated. UAVs have to plan a trajectory that is collision-free, while also being cost-effective. A simple path planning scenario in a two-dimensional (2D) environment is presented in FIG. 1, where the UAV has to avoid the (red) square obstacles. The (red) dotted line with an arrow shows the direct path to the goal, which would cause several collisions, while the (green) non-dotted line arrows show the shortest path to the goal while avoiding the obstacles.

Figure 2:
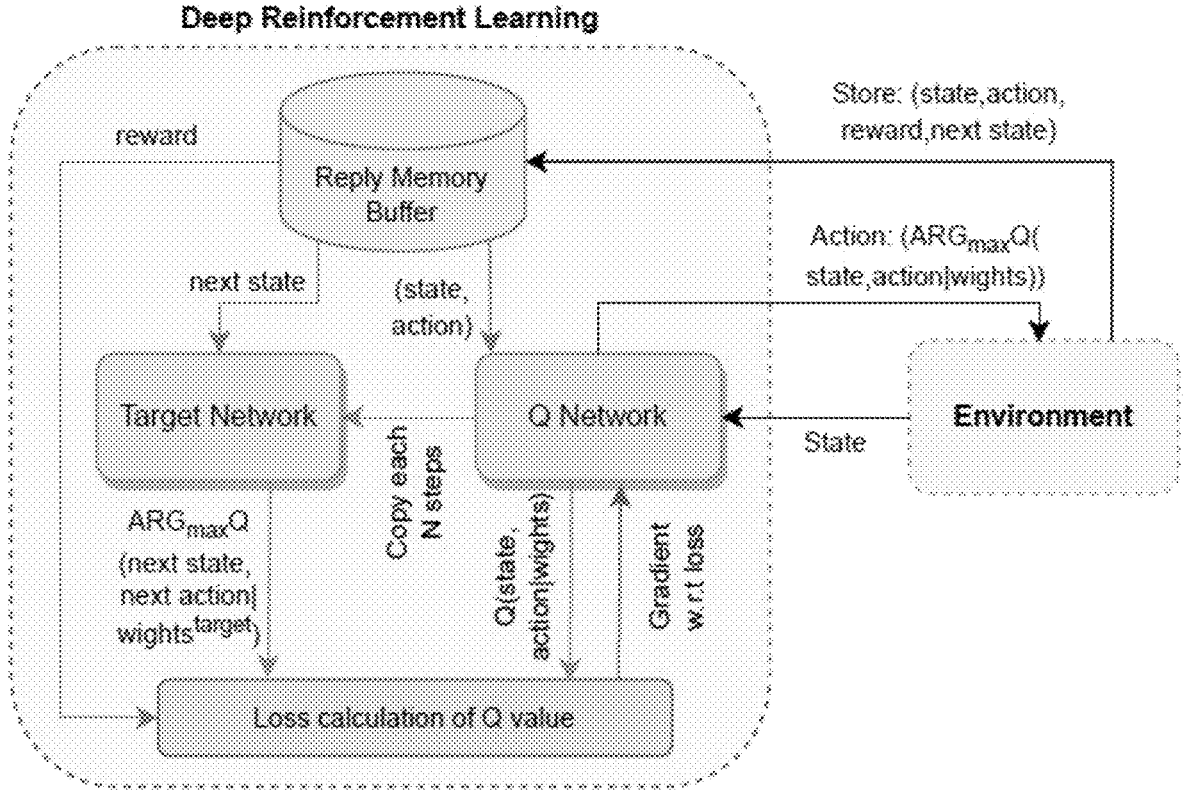
FIG. 2 shows a deep reinforcement learning (DRL) architecture.

DRL is a good method for autonomously learning complicated behaviors from limited sensor observations. Although a significant portion of DRL use has concentrated on video game applications and simulated control, which have nothing to do with the constraints of learning in real environments, DRL can make it possible for physical robots to learn complex skills in the real world. Consequently, as the real world ties directly to how a human learns, it becomes an ideal domain for evaluating DRL algorithms. Unlike basic RL, where an agent manages a Q-table, a DRL agent maintains a neural network, which can be referred to as a Q-network, as the learning mechanism. The Q-network-based learning can effectively perform exceptionally well in real-world-based complex environments. FIG. 2 shows a system diagram of a DRL architecture. For training the Q-network, the agent's experiences are saved as training data samples into a storage called a reply memory buffer. In order to provide stability to the action decision from the Q-network, an additional supplemental neural network is added to the DRL framework, called the target network. The weights from the Q-network are copied to the target network after a certain number of episode steps. The target network predicts the future Q-values for the next states, which are used to calculate the loss of the Q-network's prediction.

Figure 3:
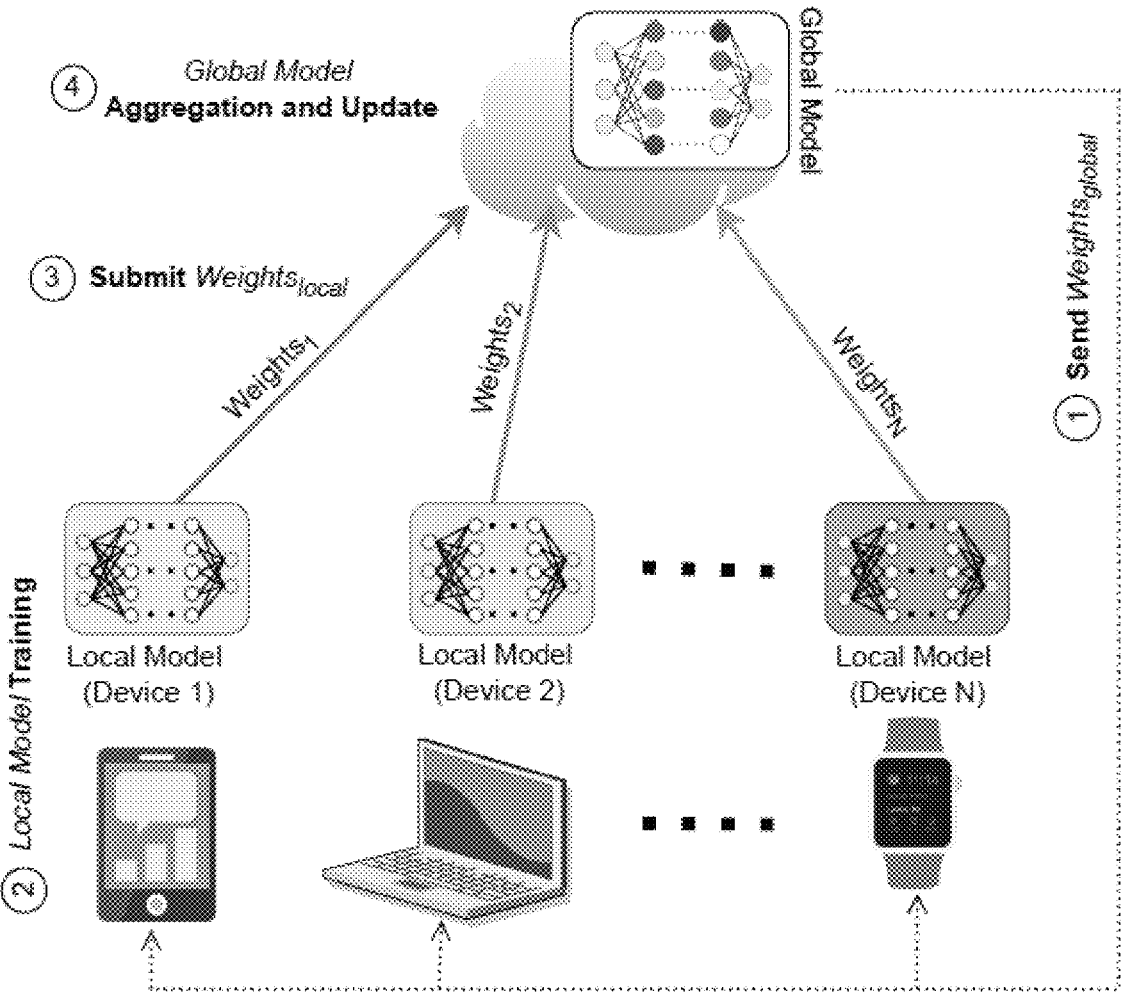
FIG. 3 shows a federated learning (FL) architecture.

Data and computation resources are often dispersed across end-user devices, different areas, or corporations. Laws or regulations often prevent the aggregated or direct sharing of distributed data and computing resources among various areas or organizations for machine learning tasks. FL is an effective approach for utilizing distributed computing and data resources to collaboratively train machine learning models. FL also abides by the rules and regulations to ensure data security and privacy (see also, Liu et al., From distributed machine learning to federated learning: A survey, Knowledge and Information Systems, pp. 1-33, 2022; which is hereby incorporated by reference herein in its entirety). The basic goal of FL is to do a collaborative on-device training of a single machine learning model without disclosing the raw training data to any other parties (see also, Wahab et al., Federated machine learning: Survey, multi-level classification, desirable criteria and future directions in communication and networking systems," IEEE Communications Surveys & Tutorials, vol. 23, no. 2, pp. 1342-1397, 2021; which is hereby incorporated by reference herein in its entirety). FIG. 3 shows the basic steps of an FL architecture, where the cloud server holds the global machine learning model to be trained. In the first iteration, the random weights of the global model are sent to the end devices, each having a local model. The end devices train their respective local models with their private data and then submit the local model's weight to the global model. Next, the global model aggregates the weights and updates its weights. The updated global model's weights are again sent to the end devices, each of which updates their local model and trains it with the private local data. These steps are repeated till the end of iterations.

Figure 4:
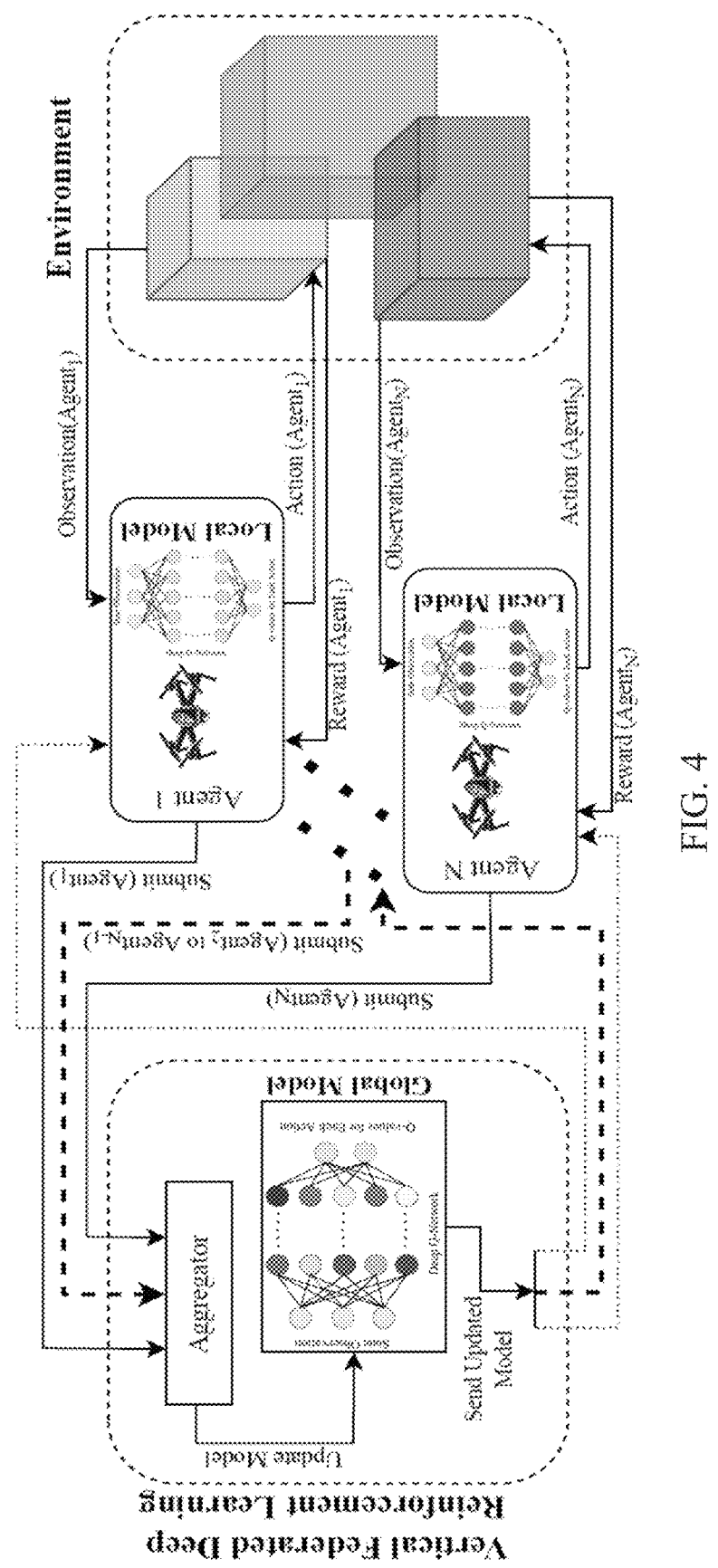
FIG. 4 shows a framework that can be used with systems and methods of embodiments of the subject invention.
Figure 6:
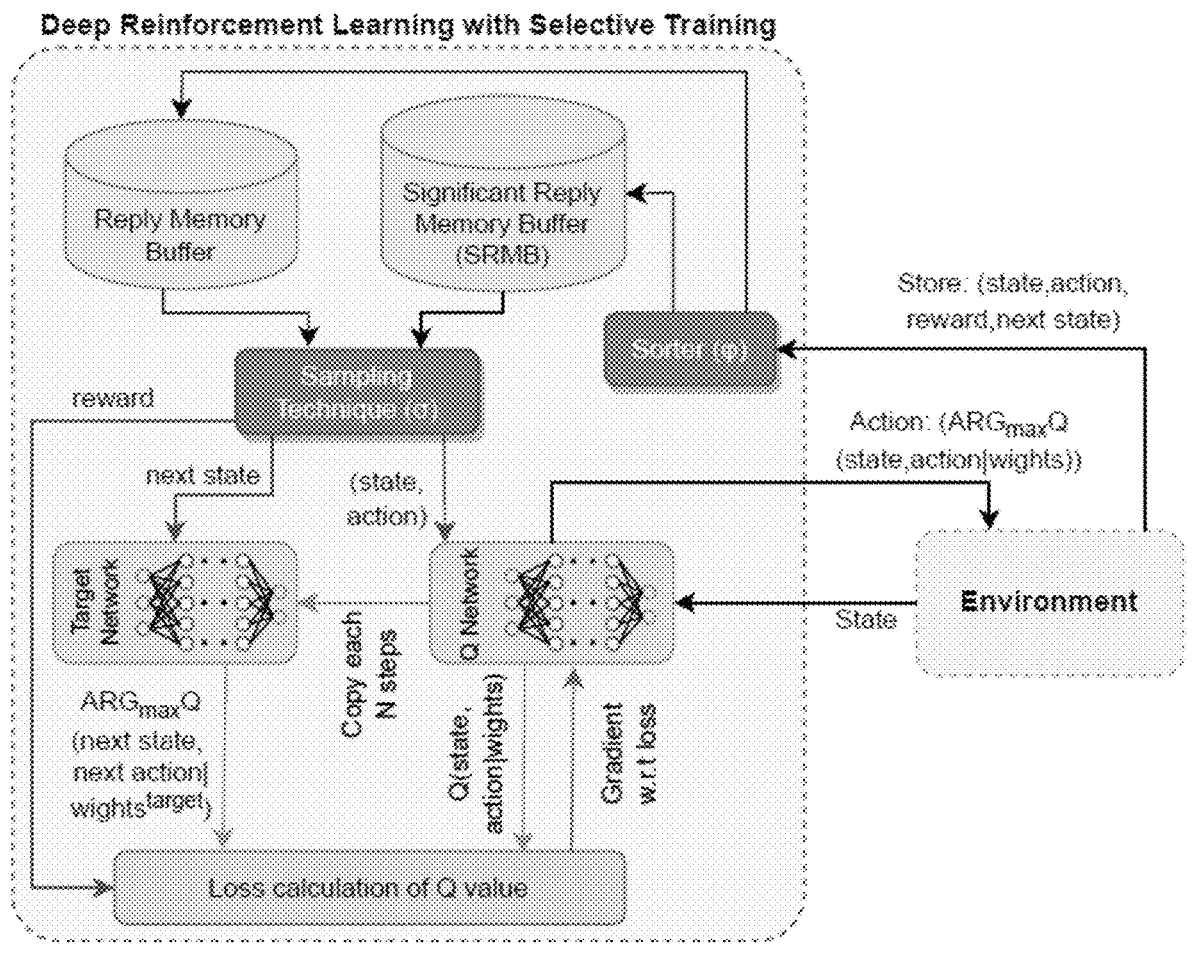
FIG. 6 shows an improved DRL architecture with a significant reply memory buffer (SRMB), which can be used with systems and methods of embodiments of the subject invention.

FIG. 4 shows the FeD-UP framework, which can be used with systems and methods of embodiments of the subject invention. Referring to FIG. 4, the vertical federated RL concept can be used, as it can be considered that a collaborating swarm of UAVs deployed in the same environment together will simultaneously explore different states of the environment. Each of the UAV agents can have its own local RL model, which can be trained through K consecutive episodes and reinitialized to replicate the global federated model at the beginning of the next $(K+1)^{th}$ episode. The observation vector size can be exactly the same for all the agents, as can the action space. Each UAV agent can be deployed at a different state in the three-dimensional (3D) environment, and they can interact and explore the surrounding states. The $\epsilon$ parameter (discussed in more detail below) can control the exploring and exploitation behavior, which can be constant for all the agents. Through the steps of an episode, the experiences of the UAV agents can be stored in the respective memory buffers of the agents (e.g., each agent can have two distinct memory buffers). At the end of each episode, the local Q-network of an agent can be trained with a random batch of experience tuples from the memory buffer of the agent. The detailed structure of the DRL mechanism-based learning of an agent is shown in FIG. 6.

The Q-network can be consulted for an agent's exploitation actions. At the end of each K episodes, the UAV agents can submit the current weights of the respective Q-networks to the vertical federated DRL (VF-DRL) module, where an aggregator module performs the weights and biases aggregation from all the local models. The global model can be updated with the aggregated weights and biases, and later sent to each of the UAV agents, when the $(K+1)^{th}$ episode begins. The structure of the global model can be exactly identical to that of the local models. The vertical nature of the FL drives the exploration faster. This can accelerate the training process of the global model and help in further improving the model performance in a relatively lower number of episodes. Algorithm 1 (shown in FIG. 12) provides the sequential steps performed in the FeD-UP framework, and the table shown in FIG. 13 shows the definition of the notation used in Algorithm 1.

Modeling DRL-Based Path Planning

The problem can be modeled as a Markov game, which is the generalization of Markov decision process (MDP). Generally, DRL MDP is a five-tuple, including the states, actions, transition probability, reward, and discount factor. However, a further sophisticated MDP was modeled for the complex hostile environment considered in for embodiments of the subject invention. Formally, the MDP can be presented by a nine-tuple: $\{S, A, T, R, \pi, \epsilon, \gamma, \phi, \sigma\}$. Each is discussed in more detail below.

1) States(S): The set of states represent all the possible observation an agent can have in the environment. In the present case, in which partially observable MDP is considered, the agents' observation at a particular time step includes one/more layers of cubes around the agent. To be more specific, if the number of layers is one, that means there is one layer of cubes around the agent, which results in twenty-seven cubes. This concept effectively simulates the agents' partial view of the whole environment. It also lets the agent to be prepared when there is an obstacle or goal nearby. It can effectively observe the point of interest if the point has reached the surrounding layers. It can also be assumed that the goal locations are known to the agent at the start of the episode, so agents can plan the trajectory towards the goals while dodging the obstacles in real time. Consequently, the observation can also include the three coordinate distances from the goals.

2) Actions (A): The set of actions represent the activity an agent can perform to interact with the environment. As a discrete environment with cubes is being considered, the movements are also discrete (and not continuous angular movement). Hence, there are eleven actions an agent can perform, which include going up, going down, going forward, going backward, going left, going right, going diagonally in four directions, and no movement (hovering).

3) Transition (T): Transition probability represents the probability of transitioning from one state to another state. In the model, the probability is dependent on the current state and the L number of previous states, where L is the number of surrounding layers (observable by the agent) chosen for that environment. This is because the agent has knowledge of the surrounding L cubes to perform a suitable action.

4) Reward (R): The rewards define the reward function that dictates the agent's learning process. The reaching of goal points awards the agent rewards while ending up on an obstacle penalizes the agent. Again, there is a movement penalty for each action taken that does not make the agent reach a goal or obstacle location.

5) Policy ($\pi$): Policy is the learning of agents, by interacting and exploring the environment; that is, which action an agent will take, given a particular state. In the present case, it is simply the Q-network's weight and biases that determine the action an agent will take for a given observation of the state.

6) Exploration Parameter ($\epsilon$): The exploration parameter controls the action behavior of the agent. It is primarily set close to 1, which means that there is an almost certain probability that the agent will take random actions to interact with the environment as exploration behavior. Those actions will shape the learning of the Q-network. As the episode progresses with additional steps, the $\epsilon$ value is decreased, and so is the probability of random action. The lower the value of $\epsilon$, the higher the probability that the agent will perform an action by consulting the Q-network, which is the exploitation behavior.

7) Discount Factor ($\gamma$): The discount factor determines the RL agents' level of concern about rewards in the distant future in comparison to those in the near future. The value of this parameter ranges from zero to one. The agent will only learn about actions that result in an immediate reward if $\gamma$ is set to zero, making it fully myopic. A reward R in that future, that occurs after N steps, will be discounted by a factor of N (i.e., the reward will be RN).

8) Sorting Parameter ($\phi$): This parameter controls the insertion of the experiences into the SRMB. The value of this parameter is set from 0 to 1, where a zero value means only the experiences where an agent ends up on a goal/obstacle are stored in SRMB, while none of the layer encounters are considered significant. The value can be incremented to one in L steps, where L is the number of layers. Let $\delta$ represent one increment for the $\phi$ value, then $\delta$ can be calculated using the following equation:

$$\delta = \frac{\phi_{max} - \phi_{min}}{L} \tag{1}$$

Here, $\phi_{max}$ and $\phi_{min}$ are set to 1 and 0, respectively. The first increment from zero means the experiences where a goal/obstacle is encountered in the first neighboring layers are stored, while the final increment up to one means all the experiences where a goal/obstacle is even in the most distant surrounding layer are stored.

9) Sampling Rate ($\sigma$): This parameter controls the sampling rate of the experience memories, which are selected for batch-wise training of the Q-Network. This parameter can take values from 0 to 1, where 0 means all the samples of the training batch are taken from the general reply memory buffer, and 1 means all the samples of the training batch are taken from the SRMB. Different values of $\sigma$ were considered to present the effect of the SRMB on the performance of FeD-UP model (see Example 5).

Selective Training with SRMB

The SRMB aids the training of the Q-network by speeding it up. Generally, in the case of DRL, the Q-network's training data is simply the experience tuples from the RL agent's exploration. In each time step, the agent's current state, current action, current reward, next state, and completion flag (indicating goal completion state) are stored into a memory buffer as a single tuple. The reply memory buffer has a predefined memory size. As an episode terminates, a random batch of tuples are selected from the memory buffer to train the Q-network. However, this randomization can hardly ensure that the Q-network is served with the memory samples that will aid the learning of intelligent behavior. The SRMB will help to train the model in a controllable manner by storing the most significant memory tuples. Each agent will have both the reply memory buffer and the SRMB, where the sampling technique (with parameter sampling rate, $\sigma$) and sorter (with sorting parameter, $\phi$) will control the effect of the SRMB. FIG. 6 shows a block diagram of an improved DRL training with SRMB.

Sorter: Unlike the general DRL, where the reply memory buffer directly receives the memory tuples, in embodiments of the subject invention the sorter can receive all the memories. Then, it can sort the memories into SRMB according to the $\phi$ parameter. Any memories that are not stored in the SRMB can be sent to the reply memory buffer for storing.

Sampling Technique: This module can be responsible for preparing the batch samples for Q-network training. According to the sampling rate parameter, this module takes B×$\sigma$ samples from the SRMB, where B is the size of a single training batch. Consequently, the rest B×(1−$\sigma$) samples can be taken from the reply memory buffer.

Federated Learning for Swarm Intelligence

The FL technique is primarily utilized for training a machine model from distributed data sources while maintaining data security. The inherit distributed learning structure of FL boosts the performance of the swarm-based learning models, as the global model gets fitted with all the diverse experiences from different swarm agents. Similar to the standard FL, the proposed vertical FL happens in four repeating steps (see FIG. 3). At the beginning of the first episode, a global model is initialized with random weights and biases, and is sent to all the agents. Then, agents initialize their local Q-network model with the received weights and biases. After each K episodes, the agents submit their current Q-network's weights and biases to the VF-DRL module, where an aggregator model is responsible for processing the received network models. Different aggregation algorithms can be used, and three such possibilities are discussed in more detail below for exemplary purposes. The global model can then be updated with the aggregated weights and biases. Next, the global model can be sent again to all the agents at the beginning of $(K+1)^{th}$ episode, and the agents can update their local Q-network copying the weights and biases received from the VF-DRL module. Following is a discussion of three aggregation algorithms that were considered (other aggregation algorithms can be used; there three were considered for exemplary purposes).

FedSGD: In federated stochastic gradient descent (SGD), a random portion of the swarm UAVs are selected by the aggregator, and their local Q-networks' gradients are averaged and utilized to create a gradient descent step for the global model (see, Yuan and Ma, Federated accelerated stochastic gradient descent, Advances in Neural Information Processing Systems, 2020; which is hereby incorporated by reference herein in its entirety).

FedAvg: In the federated averaging technique, the aggregator averages the weights and biases of all the local Q-network models from the agents to update the global model (see, Ek et al., Evaluation of federated learning aggregation algorithms: application to human activity recognition, in 2020 ACM International Symposium on Wearable Computers, 2020; which is hereby incorporated by reference herein in its entirety).

FedMA: In the federated match averaging (MA) technique, the layers are processed separately by the aggregator, where only the nodes with comparable weights are merged, and the global model's nodes are updated (see, Wang et al., Federated learning with matched averaging, arXiv preprint arXiv: 2002.06440, 2020; which is hereby incorporated by reference herein in its entirety).

Modeling of Hostile Defense System

Figures 5A, 5B:
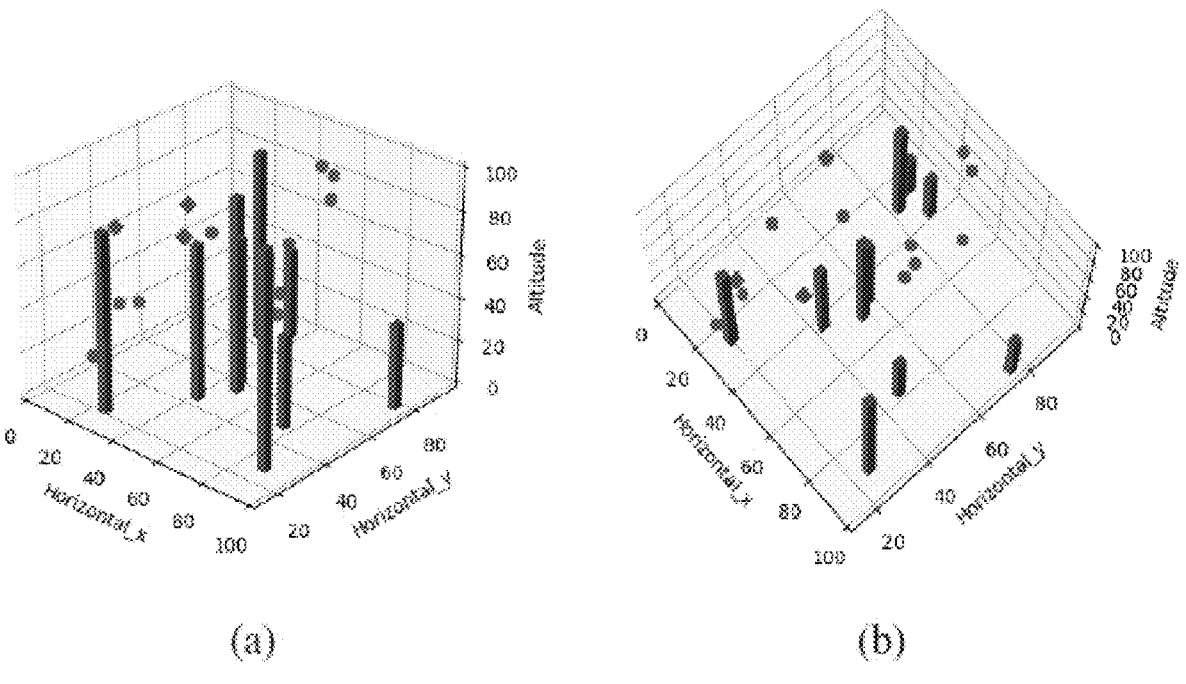
FIGS. 5(*a*) and 5(*b*) both show a simulated three-dimensional (3D) environment for a random episode.

In order to design an environment with a hostile defense setup, three types of defense systems were considered:

1) Static Defense System (SDS): These defense systems were simulated by designing static towers with different heights at different locations in the environment. In FIG. 5, the (blue) towers represent these defense systems.

2) Dynamic Fixed Route Defense System (DFRDS): These defense systems are simulated by objects moving back and forth in the environment in a fixed route. There are three kinds of routes: horizontal movement with variable x-axis values and fixed y-z axis values; horizontal movement with variable y-axis values and fixed x-z axis values; and vertical movement with variable z-axis values and fixed x-y axis values. In FIG. 5, the (red) circles/spheres represent these defense systems. This defense system resembles guarding UAVs.

3) Dynamic Stochastic Defense System (DSDS): These defense systems are simulated by objects moving randomly in the environment, without any fixed route or path. In FIG. 5, the (red) circles/spheres represent these defense systems too. This defense system resembles surveying and exploring UAVs.

Embodiments of the subject invention enable UAVs to intelligently navigate through real-world hostile environments and complete tasks through accelerated collaborative learning. On encountering defense systems during aerial reconnaissance, UAVs can adjust the trajectory to avoid collision in real time. Embodiments enable quicker training of DRL agents by parallelism achieved through FL with a swarm of agents, which is suitable for critical military application circumstances. Embodiments facilitate intelligent "instinctive" actions of UAVs (agents) through the SRMB module, which is a desired attribute for drone-based delivery industries.

Systems of embodiments of the subject invention can include the UAV or UAVs running the framework. Systems can also include a processor and a machine-readable medium having instructions stored thereon that, when executed (e.g., by the processor), perform the steps necessary to implement/utilize the FeD-UP framework. Systems can also include a display in operable communication with the processor and/or machine-readable medium for displaying input and/or output for the FeD-UP framework. A computer or computers can be used and can include the processor, the machine-readable medium, and/or the display. Methods of embodiments of the subject invention can include implementing/utilizing the FeD-UP framework, training the UAV(s) (e.g., using the FeD-UP framework, such as using FL to train a swarm of UAVs), and/or deploying the UAV(s) after and/or while implementing/utilizing the FeD-UP framework. The processor, machine-readable medium, display, and/or computer(s) mentioned above can be used in the methods of embodiments of the subject invention.

Embodiments of the subject invention provide a focused technical solution to the focused technical problem of how to increase the safety and goal-achieving capability of UAVs deployed into areas with unpredictable obstacles (e.g., hostile military areas). The solution is provided by integrating the learning capabilities of FL with an improved deep RL framework, including using an SRMB to accelerate the intelligent behavior. This can vastly improve the performance of the UAVs and can also improve any computer running the framework by significantly reducing computing resources needed for training and/or controlling the UAV(s) via an efficient algorithm (which can free up memory and/or processor usage).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, combinations and subcombinations of ranges (e.g., subranges within the disclosed range) and specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

The following evaluation metrics were defined and used in the evaluations:

Goal Completion Percentage (GCP): This metric defines what percentage of goal set has been visited or processed. As a result, the GCP can be described as follows:

$$GCP = \frac{\text{\# of goals completed}}{\text{\# of total goals in the goal set}} \quad (2)$$

Obstacles Encounter Count (OEC): This metric defines how many times hostile entities have been encountered. This is the summation of total hostile encounter. OEC can be defined as:

$$OEC = \sum_{i \in Agents} count_i \quad (3)$$

Here, $count_i$ is the number of times the i-th agent has encountered an obstacle, and Agents refers to the set of all agents.

Average Distance Travelled (ADT): This metric defines the average amount of distance the agents have to travel to reach their goal points. Ideally, the smaller the ADT, the more efficient the path planning technique. ADT is defined as follows:

$$ADT = \frac{1}{\text{size(Agents)}} \sum_{i \in Agents} d_i \quad (4)$$

Here, $d_i$ is the distance that i-th agent had to travel to complete its goal set, and Agents refers to the set of all agents.

The performance of the FeD-UP framework of systems and methods of embodiments of the subject invention was evaluated via a comparative analysis with DRL and SRMB-DRL (i.e., DRL with SRMB, but no FL) with respect to GCP, OEC, and ADT.

Example 1

Figures 7A, 7B, 7C:
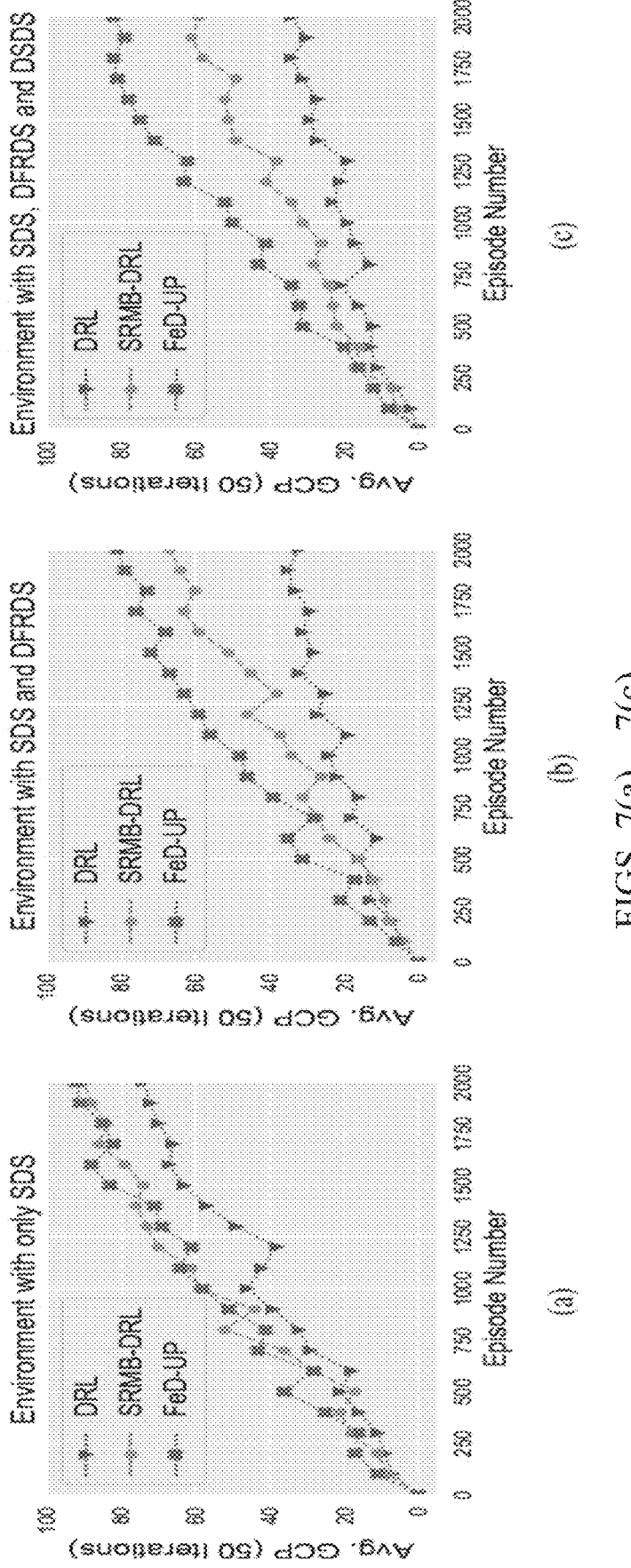
FIGS. 7(*a*)-7(*c*) show plots of average goal completion percentage (GCP) (over 50 iterations) for a series of episodes.

The goal completion capability in different hostile setups was evaluated. FIGS. 7(a)-7(c) show the average GCP of agent swarms with different learning techniques, in environments with progressively higher difficulty. Referring to FIG. 7(a), it can be seen that with only static obstacles, all the techniques perform similarly. However, as the dynamic obstacles are introduced in the environment (FIG. 7(b) and FIG. 7(c)), there arises visible performance differences among the methods. Although the average GCP goes down for all the methods, FeD-UP performs substantially better than SRMB-DRL and DRL (completing around 80% of goals). The SRMB-DRL technique, even without FL, does perform better than the standard DRL method, completing around 60% of goals in the dynamic environment.

Example 2

Figures 8A, 8B, 8C:
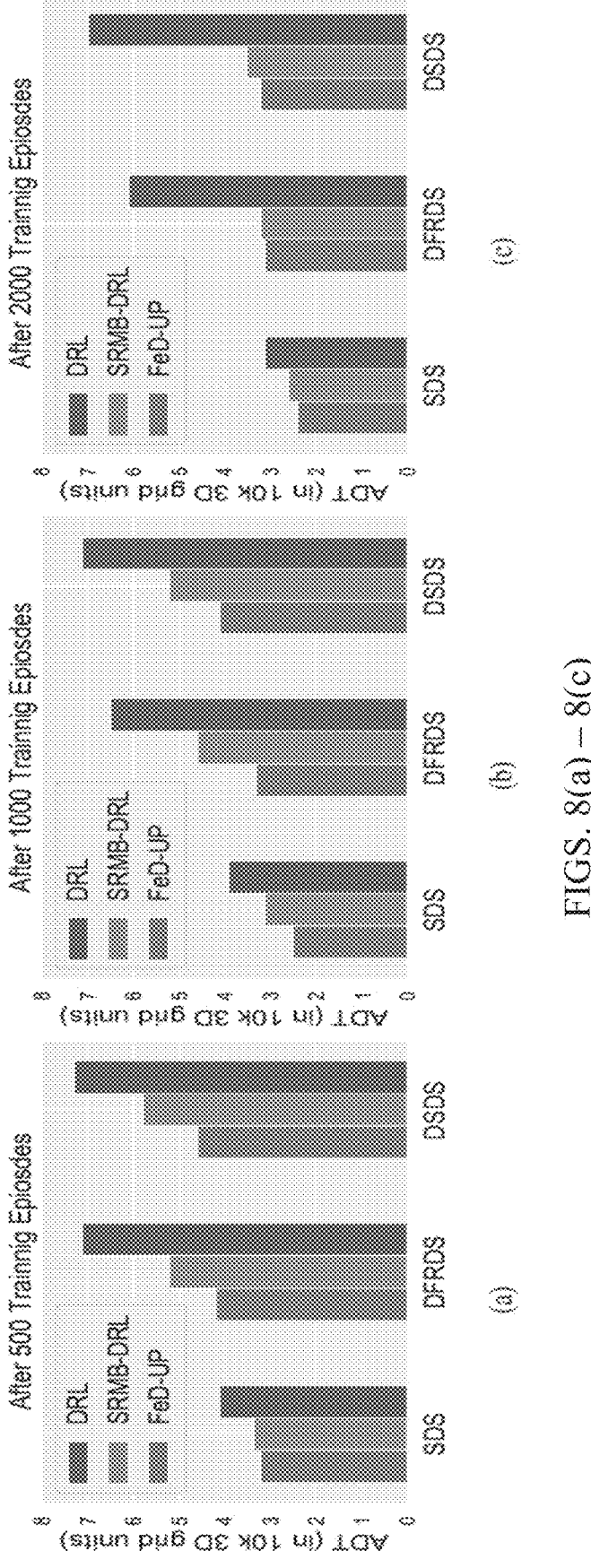
FIGS. 8(*a*)-8(*c*) show bar charts of average distance travelled (ADT) (in 10,000 3D grid units) for environments with an SDS (left-most group of bars), environments with a DFRDS (middle group of bars), and environments with a DSDS (right-most group of bars).

The optimal travel distance in different hostile environments was evaluated. FIGS. 8(a)-8(d) present the ADT of the UAV swarms that were trained with different methods. With 500 training episodes, it can be observed in FIG. 8(a) that the FeD-UP agents require minimal distance traveled to complete the goal set in every kind of hostile setup. In FIG. 8(b), after 1000 training episodes, a fast improvement of the FeD-UP method can be observed, while other techniques improve linearly. Referring to FIG. 8(c), it can be seen that SRMB-DRL improves the most and gets close to the performance of FeD-UP (around 25,000 3D grid units), while there is little improvement in the latter. This is because the training performance of FeD-UP with respect to ADT becomes saturated after 1000 episodes. Even after 2000 episodes, there is minimal improvement observed for the standard DRL.

Example 3

Figures 9A, 9B, 9C:
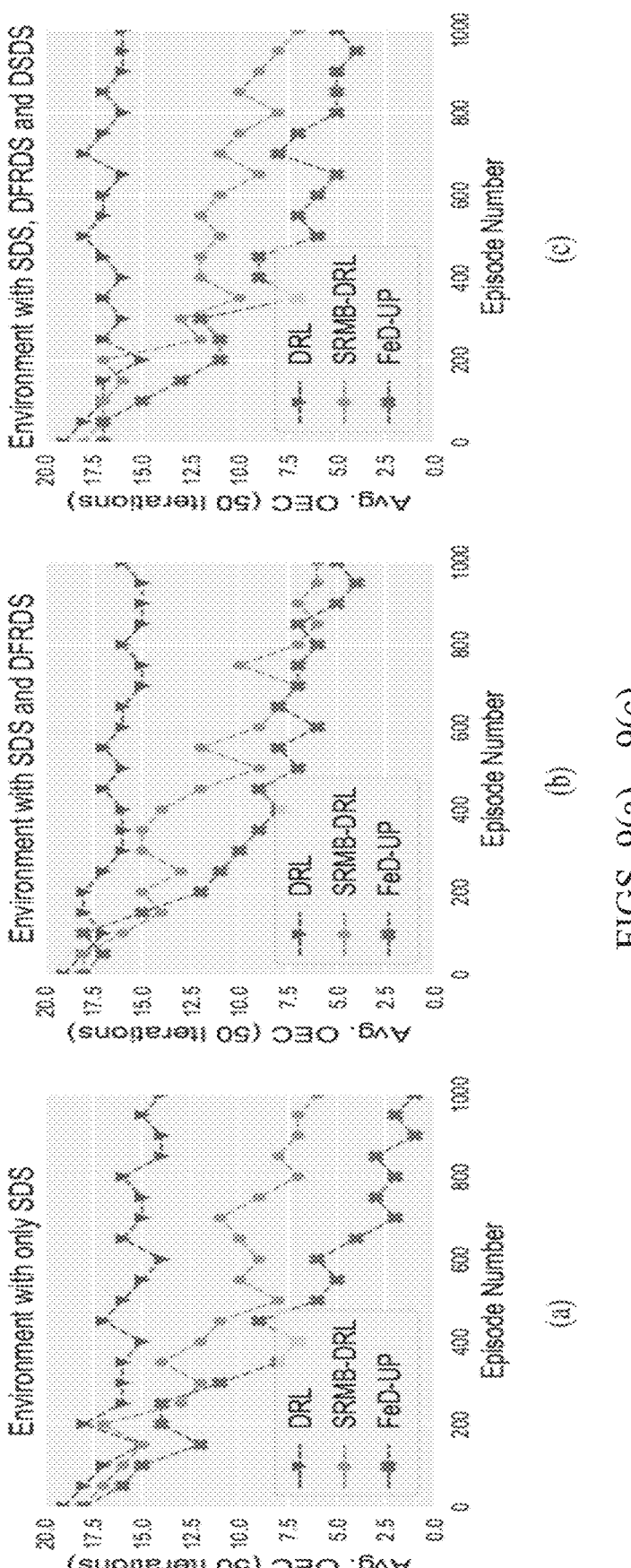
FIGS. 9(*a*)-9(*c*) show plots of average obstacle encounter count (OEC) (over 50 iterations) for a series of episodes.

The obstacle avoidance capability in different hostile setups was evaluated with respect to the OEC performance in progressively more difficult hostile environments. The results are shown in FIGS. 9(a)-9(c). With only SDS, FeD-UP performed substantially better than both DRL and SRMB-DRL, as presented in FIG. 9(a). However, as the dynamic obstacles were introduced in the environment (FIG. 9(b) and FIG. 9(c)), the performance of SRMB-DRL became comparable to FeD-UP. This is because both of the techniques utilize the SRMB, while the slight advantage for FeD-UP comes from the VF-DRL module. The overall performance of both methods degrades as the hostile environment becomes more difficult.

Example 4

Figures 10A, 10B, 10C:
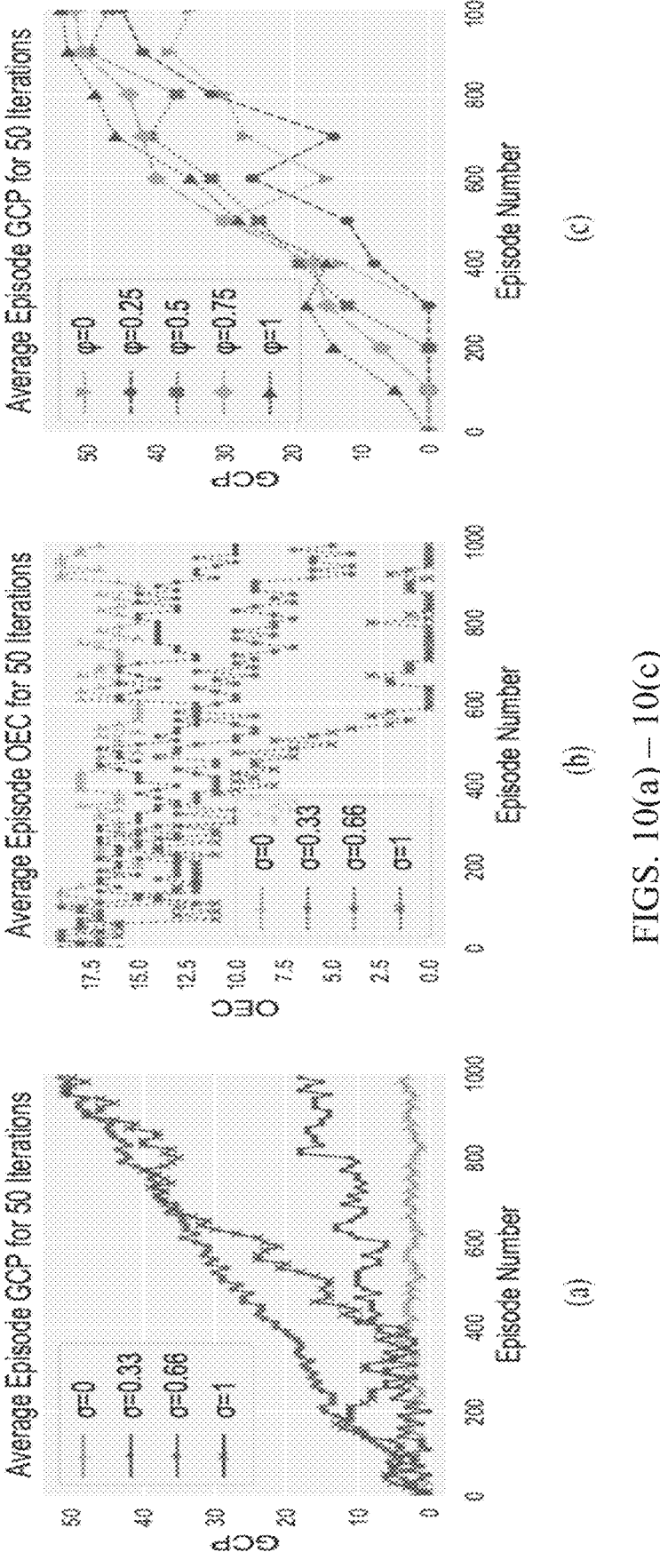
FIGS. 10(*a*)-10(*c*) show plots of results of an experiment for determining optimal values of σ and φ parameters of SRMB.

An experiment was performed to determine advantageous/optimal parameters of SRMB ($\sigma$ and $\phi$), with the results shown in FIGS. 10(a)-10(c). Referring to FIG. 10(a), it can be observed that when all the significant experiences are ignored in the training phase ($\sigma$=0), there is no improvement in GCP, as the agents do not know what the goals/obstacles are. As the value of $\sigma$ is increased, the performance with respect to GCP improves. However, setting $\sigma$ to 1 incurs some random behavior, as the agents only know the significant situations and do not know what to do when no goals/obstacles are around. It was found that the optimal value of σ is around 0.7 with respect to GCP performance (maximum average GCP). Referring to FIG. 10(*b*), similar behavior was observed for a zero value of σ, as the agents do not know what an obstacle is. However, setting σ to 1, in this case caused the OEC to decrease to zero very quickly. This is because the agent is trained very well about what to do when an obstacle is around. Referring to FIG. 10(*c*), the φ value was varied, and a linear improvement of performance with respect to GCP was observed. This is because more observable layers help the agent act better when goals are in the surrounding area.

Example 5

An experiment was performed using different aggregator models. The table in FIG. 14 shows the comparative analysis of the aggregator algorithms, with different K values. The K value was first set to 1, meaning the global model is updated after every episode. Then, the K value was increased, and it was observed that setting this parameter's value to 6 incurred the highest average reward after 2000 episodes. Also, the FedAvg algorithm was found to be the most fitting option for this application.

Example 6

Figure 11:
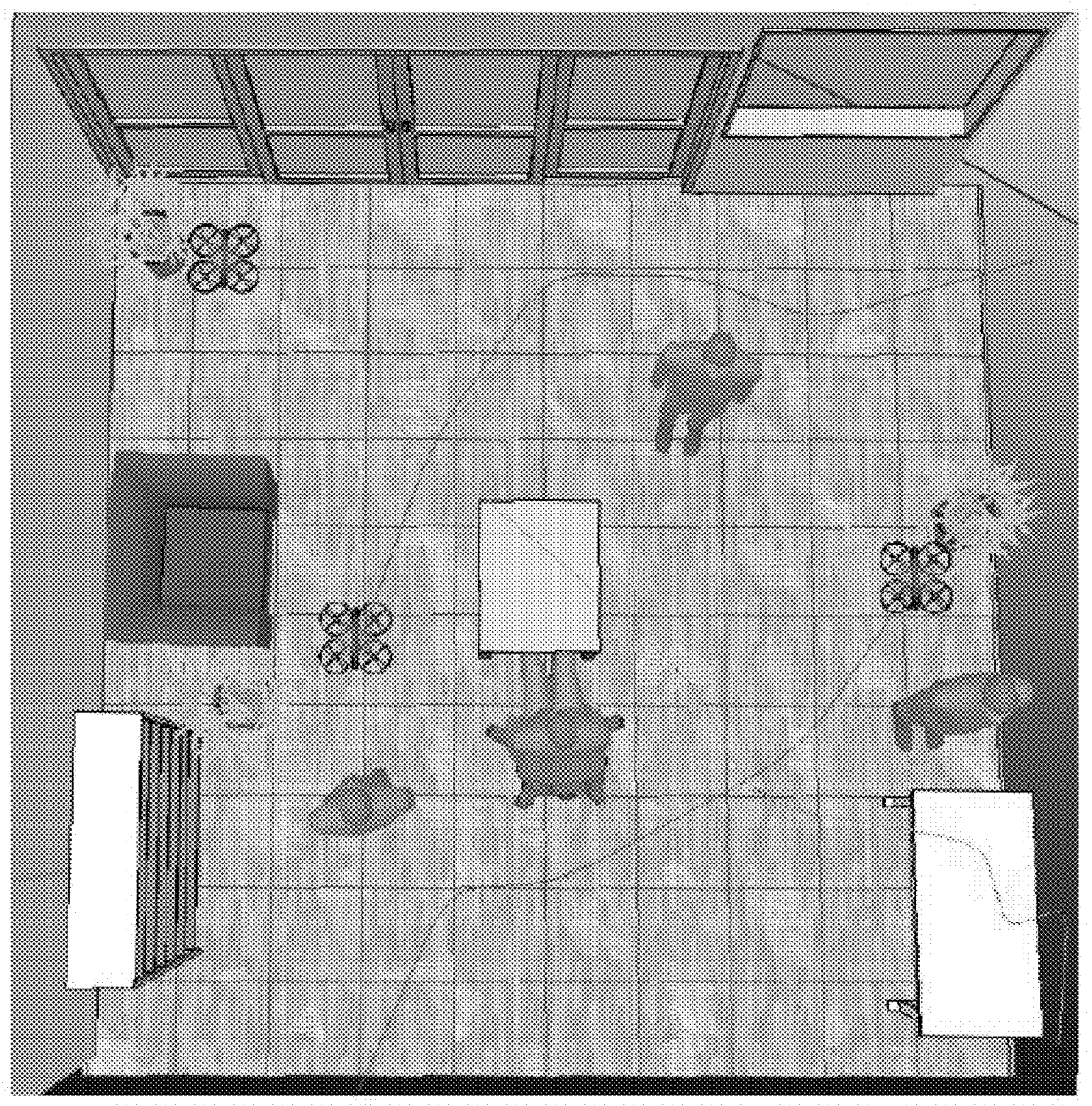
FIG. 11 shows an overhead image of a case study of FeD-UP using a simulator (CoppeliaSim Robotics Simulator).

The CoppeliaSim Robotics Simulator (see, Rooban et al., supra.) was used to run simulations for the 3D hostile environment to see how well the FeD-UP framework performed in real-world situations. A physics engine was provided by the simulator to simulate real-world events, such as wind. In the simulation, goals were represented by trees in tubs, while hostile defenses were represented by moving people and office equipment (see FIG. 11). The simulation's intelligent behavior of the UAVs showed that even without taking into account the intricate environmental characteristics, the FeD-UP framework generalized the trajectory effectively and could control real UAVs in real hostile environments.

The examples show that the FeD-UP framework outperformed the standard DRL method in both the simplistic environment setup (only SDS) and complex environment setups (with DFRDS and DSDS). The model training was much faster than DRL in terms of training episodes. In addition, there was a significant improvement in performance in terms of obstacles avoidance (68% lower OEC with dynamic defense), goal completion (113% greater GCP with dynamic defense), and minimizing travel distance (57% less ADT with dynamic defense).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A system for real-time path planning for unmanned aerial vehicles (UAVs), the system comprising:
   a processor; and a machine-readable medium in operable communication with the processor and having instructions stored thereon that, when executed by the processor, perform the following steps:

a) receiving experience data of a plurality of UAVs in an environment;

b) sorting the experience data into critical experience data and non-critical experience data;

c) storing the critical experience data in a first reply memory buffer that is a significant reply memory buffer (SRMB) and storing the non-critical experience data in a second reply memory buffer;

d) performing a sample technique on the critical experience data from the first reply memory buffer and the non-critical experience data from the second reply memory buffer to obtain sample data;

e) providing the sample data to a Q-network, the Q-network being a first deep reinforcement learning (DRL) neural network;

f) copying weights from the Q-network to a target network after a predetermined number of episode steps of the Q-network, the target network being a second DRL neural network;

g) using the target network to predict future Q-values for future states;

h) calculating a loss of a prediction of the Q-network based on the future Q-values;

i) calculating an updated path model for the plurality of UAVs based on the prediction of the Q-network and the loss of the prediction of the Q-network;

j) generating, by the plurality of UAVs, updated experience data using the updated path model;

k) repeating steps a)-j), starting with the updated experience data, until the updated path model meets a predetermined threshold to obtain a final path model, and l) maneuvering the plurality of UAVs based on the final path model, the performing of the sample technique comprising setting a value for a percentage of critical experience data from the first reply memory buffer that makes up the sample data, where a remainder of the sample data is the non-critical experience data from the second reply memory buffer.

2. The system according to claim 1, the environment being a simulated environment.

3. The system according to claim 1, the experience data being generated using federated learning (FL) of DRL agents.

4. The system according to claim 1, the environment comprising a hostile defense system.

5. The system according to claim 4, the hostile defense system comprising a static defense system and a dynamic defense system.

6. The system according to claim 1, the sorting of the experience data comprising classifying experiences where a UAV of the plurality of UAVs ended on a goal or an obstacle as critical experience data and classifying experiences where a UAV of the plurality of UAVs did not end on a goal or an obstacle as non-critical experience data.

7. The system according to claim 1, the generating of updated experience data comprising setting an exploitation parameter in a range of from 0 to 1, where a higher value of the exploitation parameter indicates a higher probability that the plurality of UAVs will take random actions during the generating of updated experience data, and where a lower value of the exploitation parameter indicates a higher probability that the plurality of UAVs will take actions by consulting the Q-network during the generating of updated experience data.

8. The system according to claim 1, the plurality of UAVs comprising at least 10 UAVs.

9. The system according to claim 1, further comprising a display in operable communication with at least one of the processor and the machine-readable medium, and the instructions when executed further performing the step of:

m) displaying the final path model on the display.

10. A method for real-time path planning for unmanned aerial vehicles (UAVs), the method comprising:

a) receiving experience data of a plurality of UAVs in an environment;

b) sorting the experience data into critical experience data and non-critical experience data;

c) storing the critical experience data in a first reply memory buffer that is a significant reply memory buffer (SRMB) and storing the non-critical experience data in a second reply memory buffer;

d) performing a sample technique on the critical experience data from the first reply memory buffer and the non-critical experience data from the second reply memory buffer to obtain sample data;

e) providing the sample data to a Q-network, the Q-network being a first deep reinforcement learning (DRL) neural network;

f) copying weights from the Q-network to a target network after a predetermined number of episode steps of the Q-network, the target network being a second DRL neural network;

g) using the target network to predict future Q-values for future states;

h) calculating a loss of a prediction of the Q-network based on the future Q-values;

i) calculating an updated path model for the plurality of UAVs based on the prediction of the Q-network and the loss of the prediction of the Q-network;

j) generating, by the plurality of UAVs, updated experience data using the updated path model;

k) repeating steps a)-j), starting with the updated experience data, until the updated path model meets a predetermined threshold to obtain a final path model, and l) maneuvering the plurality of UAVs based on the final path model, the performing of the sample technique comprising setting a value for a percentage of critical experience data from the first reply memory buffer that makes up the sample data, where a remainder of the sample data is the non-critical experience data from the second reply memory buffer.

11. The method according to claim 10, the environment being a simulated environment.

12. The method according to claim 10, the experience data being generated using federated learning (FL) of DRL agents.

13. The method according to claim 10, the environment comprising a hostile defense system.

14. The method according to claim 13, the hostile defense system comprising a static defense system and a dynamic defense system.

15. The method according to claim 10, the sorting of the experience data comprising classifying experiences where a UAV of the plurality of UAVs ended on a goal or an obstacle as critical experience data and classifying experiences where a UAV of the plurality of UAVs did not end on a goal or an obstacle as non-critical experience data.

16. The method according to claim 10, the generating of updated experience data comprising setting an exploitation parameter in a range of from 0 to 1, where a higher value of the exploitation parameter indicates a higher probability that the plurality of UA Vs will take random actions during the generating of updated experience data, and where a lower value of the exploitation parameter indicates a higher probability that the plurality of UAVs will take actions by consulting the Q-network during the generating of updated experience data.

17. The method according to claim 10, further comprising:

m) displaying the final path model on a display.

18. A system for real-time path planning for unmanned aerial vehicles (UAVs), the system comprising:

a processor;

a display in operable communication with the processor; and a machine-readable medium in operable communication with the processor and the display and having instructions stored thereon that, when executed by the processor, perform the following steps:

a) receiving experience data of a plurality of UAVs in an environment;

b) sorting the experience data into critical experience data and non-critical experience data;

c) storing the critical experience data in a first reply memory buffer that is a significant reply memory buffer (SRMB) and storing the non-critical experience data in a second reply memory buffer;

d) performing a sample technique on the critical experience data from the first reply memory buffer and the non-critical experience data from the second reply memory buffer to obtain sample data;

e) providing the sample data to a Q-network, the Q-network being a first deep reinforcement learning (DRL) neural network;

f) copying weights from the Q-network to a target network after a predetermined number of episode steps of the Q-network, the target network being a second DRL neural network;

g) using the target network to predict future Q-values for future states;

h) calculating a loss of a prediction of the Q-network based on the future Q-values;

i) calculating an updated path model for the plurality of UAVs based on the prediction of the Q-network and the loss of the prediction of the Q-network;

j) generating, by the plurality of UAVs, updated experience data using the updated path model;

k) repeating steps a)-j), starting with the updated experience data, until the updated path model meets a predetermined threshold to obtain a final path model; and l) maneuvering the plurality of UAVs based on the final path model; and m) displaying the final path model on the display, the environment being a simulated environment, the experience data being generated using federated learning (FL) of DRL agents, the environment comprising a hostile defense system comprising a static defense system and a dynamic defense system, the sorting of the experience data comprising classifying experiences where a UAV of the plurality of UAVs ended on a goal or an obstacle as critical experience data and classifying experiences where a UAV of the plurality of UAVs did not end on a goal or an obstacle as non-critical experience data, the performing of the sample technique comprising setting a value for a percentage of critical experience data from the first reply memory buffer that makes up the sample data, where a remainder of the sample data is the non-critical experience data from the second reply memory buffer, the generating of updated experience data comprising setting an exploitation parameter in a range of from 0 to 1, where a higher value of the exploitation parameter indicates a higher probability that the plurality of UAVs will take random actions during the generating of updated experience data, and where a lower value of the exploitation parameter indicates a higher probability that the plurality of UAVs will take actions by consulting the Q-network during the generating of updated experience data, and the plurality of UAVs comprising at least 10 UAVs.

* * * * *